United States Patent [19]

Hays

[11] Patent Number: 4,782,916

[45] Date of Patent: Nov. 8, 1988

[54] PLATFORM FOR SUPPORT WHILE WORKING IN THE ENGINE COMPARTMENT OF A VEHICLE

[76] Inventor: Kenneth E. Hays, 22 Elannchester Dr., Manchester, Mo. 63011

[21] Appl. No.: 31,773

[22] Filed: Mar. 30, 1987

[51] Int. Cl.⁴ .............................................. B60R 3/00
[52] U.S. Cl. ...................................... 182/150; 182/92; 250/165
[58] Field of Search ......................... 182/150, 151, 92; 280/165

[56] References Cited

U.S. PATENT DOCUMENTS

| | | | |
|---|---|---|---|
| 2,575,503 | 11/1951 | Warren | 182/150 |
| 2,848,150 | 8/1958 | Tans | 182/150 |
| 2,878,078 | 3/1959 | Moultrop | 182/150 |
| 2,973,052 | 2/1961 | Miller | 182/150 |
| 3,078,952 | 2/1963 | Kelling | 182/150 |
| 3,590,950 | 7/1971 | Wilson | 182/150 |
| 4,519,476 | 5/1985 | Marques | 182/151 |
| 4,586,585 | 5/1986 | Laner | 182/206 |
| 4,620,609 | 11/1986 | Elsten | 182/92 |

Primary Examiner—Reinaldo P. Machado
Attorney, Agent, or Firm—Senniger, Powers, Leavitt and Roedel

[57] ABSTRACT

A platform for supporting a person while working in the engine compartment of a vehicle, such as a truck. The platform comprises a generally planar member and two legs on the generally planar member having hooks at their upper ends for hooking onto either the front bumper or a front wheel of the vehicle thereby to suspend the planar member in a position wherein it is generally horizontal and at an elevation above the ground where a person standing on the planar member has convenient access to the engine compartment of the vehicle. Also disclosed is such a platform wherein the hook arms are detachable from the planar member for storage within the planar member.

3 Claims, 2 Drawing Sheets

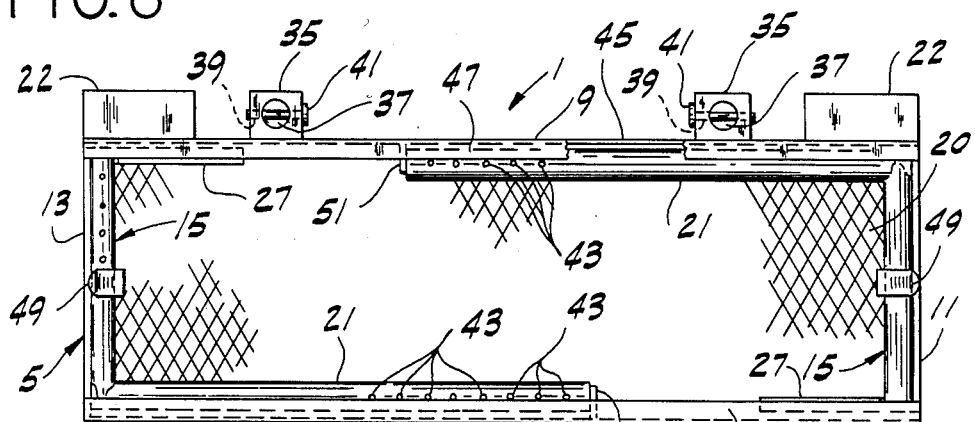
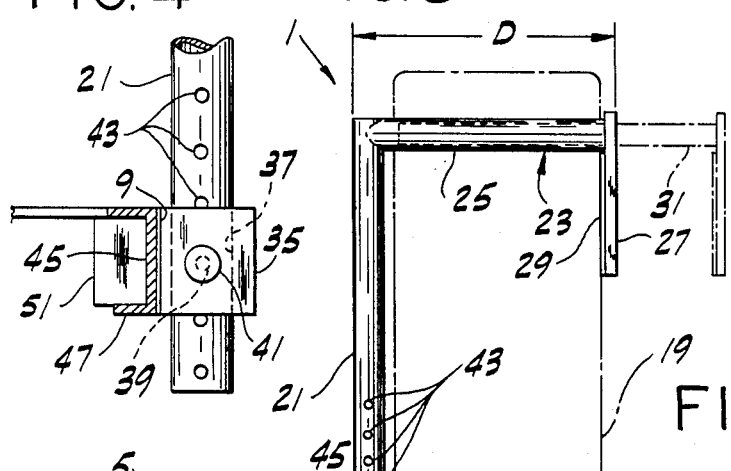
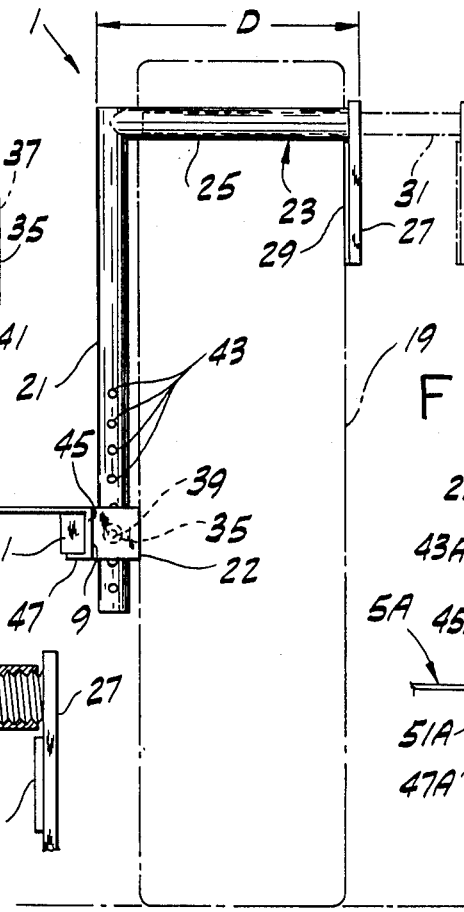
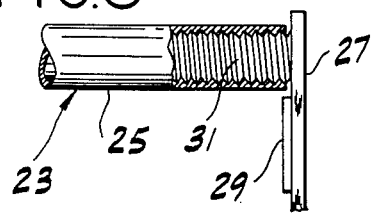
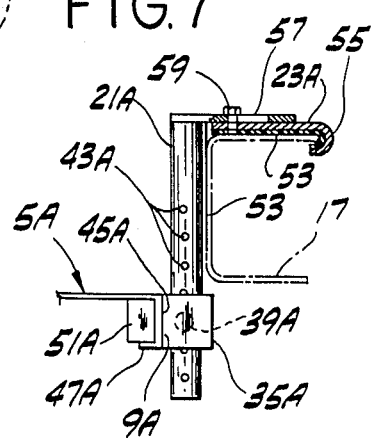

PLATFORM FOR SUPPORT WHILE WORKING IN THE ENGINE COMPARTMENT OF A VEHICLE

BACKGROUND OF THE INVENTION

This invention relates generally to platforms for support, and more particularly to a horizontal platform for supporting a person while working in the engine compartment of a vehicle such as a truck.

Working in the engine compartment of trucks, especially large trucks, is inconvenient due to the height of the compartment above the ground, which often necessitates either standing on the front bumper of the truck or, alternatively, using a ladder or stool. However, both of these alternatives are unsatisfactory, the first because it is unsafe and inefficient, and the second because it requires the use of a bulky piece of equipment which is typically not available when needed.

SUMMARY OF THE INVENTION

Among the several objects of the invention may be noted the provision of a platform for supporting a person while working in the engine compartment of a vehicle, such as a truck; the provision of such a platform which is easily assembled and attached to the vehicle, and easily detached from the truck and disassembled; the provision of such a platform which is adapted for easy transport and storage; the provision of such a platform which is adapted to be attached to the vehicle without damaging the vehicle, especially the painted surfaces of the vehicle; the provision of such a platform which is adjustable for different size vehicles and/or persons of different height; the provision of such a platform which is adapted for attachment to the vehicle adjacent the sides or front of the engine compartment; the provision of such a platform which is inexpensive to manufacture and simple in construction; and the provision of such a platform which is durable.

Generally, a platform of the present invention is useful for supporting a person while working in the engine compartment of a vehicle, such as a truck. The platform comprises a generally planar member and hook means on the generally planar member for hooking onto either the front bumper or a front wheel of the vehicle thereby to suspend the planar member in a position wherein it is generally horizontal and at an elevation above the ground where a person standing on the planar member has convenient access to the engine compartment of the vehicle.

In a second aspect of the invention, the hook means is detachable from the generally planar member, and the planar member has storage means for receiving the hook means generally within the planar member whereby the hook means may be stored in the planar member when detached therefrom.

Other objects and features will be in part apparent and in part pointed out hereinafter.

BRIEF DESCRIPTION OF THE DRAWINGS

FIG. 3 is a side view of the platform of FIGS. 1 and 2;

FIG. 4 is an enlarged cross-sectional view taken along line 4—4 of FIG. 2;

FIG. 5 is an enlarged partial side view along 5—5 of FIG. 3;

FIG. 6 is a bottom plan view of the platform of FIGS. 1-5 showing hook means stored in the platform; and FIG. 7 is a partial side view of another embodiment of a platform of the present invention.

Corresponding reference characters indicate corresponding parts throughout the several views of the drawings.

DESCRIPTION OF PREFERRED EMBODIMENTS

Figure 1:
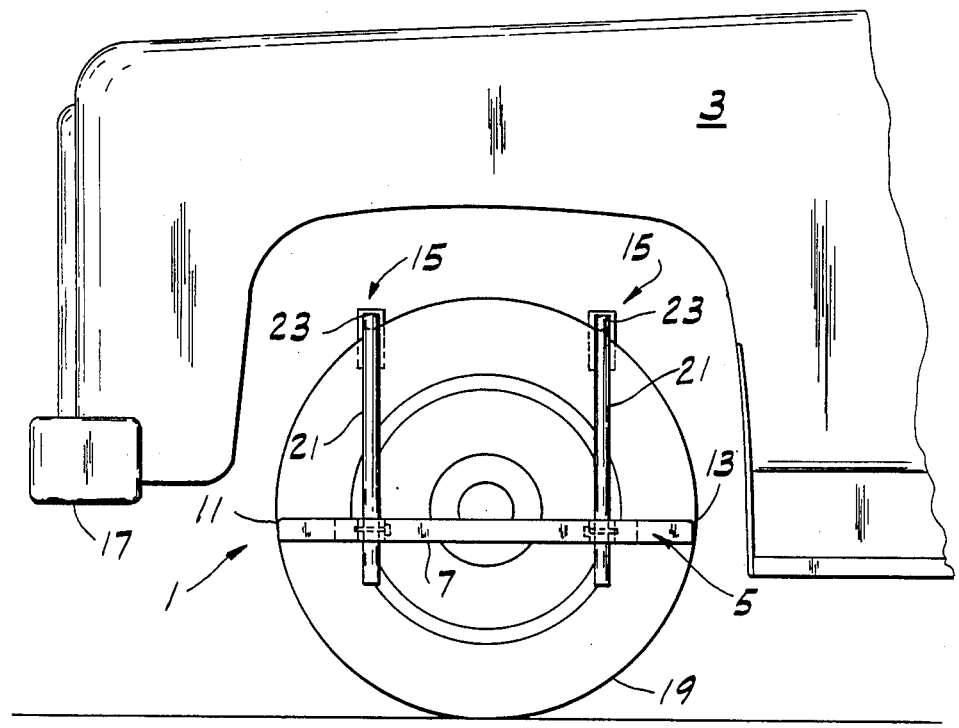
FIG. 1 is a view of a platform of the present invention attached to a front wheel of a truck.
Figure 2:
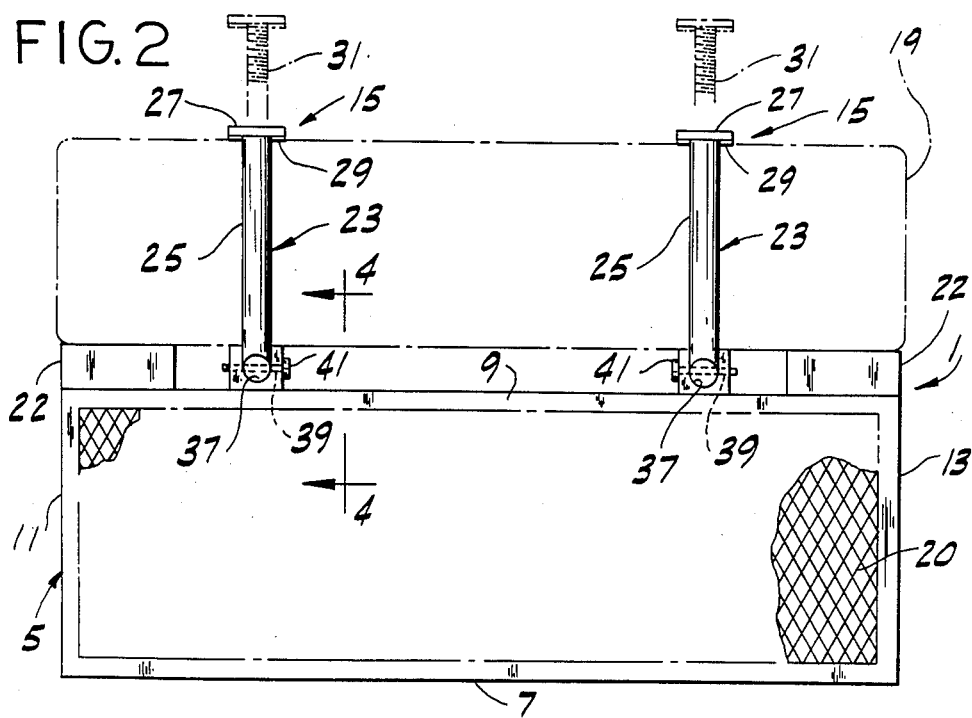
FIG. 2 is a top plan of the platform of FIG. 1.

Referring now to the drawings, a platform of the present invention is designated in its entirety by reference numeral 1. As illustrated in FIG. 1, the platform 1 is particularly useful for supporting a person while working in the engine compartment of a vehicle, such as a truck 3.

The platform 1 comprises a generally planar member 5 (e.g., of aluminum alloy) having a front 7, a back 9 and opposite sides 11 and 13, and hook means 15 on the back of the planar member for hooking onto either the front bumper 17 or a front wheel 19 of the vehicle 3 thereby to suspend the platform from the vehicle. The top surface of the planar member comprises a non-slip tread or grate 20. Support or standoff structures 22 are provided adjacent opposite ends of the back 9 of the planar member 5. The support or standoff structures 22 are adapted to engage the tire's side wall when hook means 15 is hooked onto the wheel 19.

The hook means 15 comprises a pair of generally vertical legs, each designated 21, adapted to be attached to the back 9 of the planar member 5, and hooks, each designated 23, at the upper ends of the legs for hooking over wheel 19 of the vehicle. Each hook 23 includes a tubular inner portion 25 extending rearwardly from the upper end of a respective leg and an outer portion (e.g., an elongate plate 27) depending from the rearward end of the inner portion. The front face of each elongate plate 27 preferably has a layer of protective padding 29 thereon (FIGS. 3 and 5) adapted to engage the backside of wheel 19.

As shown in FIG. 5, the inner portion 25 of each hook means 15 preferably has a threaded internal bore for receiving and securing a telescoping threaded extension or stud 31 on the elongate plate 27 so that the elongate plates may be pivoted in a plane generally parallel to the plane of the legs 21 and so that the distance between the elongate plates and the legs may be varied to accommodate different size wheels. Alternatively, a series of longitudinally-spaced openings (not shown) may be provided through the inner portion 25 and an opening (not shown) provided through the telescoping stud 31. A pin or screw (not shown) would then be used to lock or secure the stud 31 in adjusted position with respect to the inner portion 25.

Fastener means is provided for removably fastening the legs 21 generally adjacent their lower ends to the planar member 5. For example, fastener means may comprise brackets, each designated 35 (FIG. 4), welded to the back 9 of the planar member 5 for receiving the legs. Each bracket 35 is formed with a pair of vertically aligned openings 37 for receiving one of the legs 21 and a pair of horizontally aligned openings 39 for receiving a pin 41. Preferably, the longitudinal axis of the horizontally aligned openings 39 of the bracket is generally parallel to the planes of the top and back surfaces of the planar member 5, and the longitudinal axis of the vertically aligned openings 37 is generally perpendicular to the top surface of the planar member. A plurality of openings 43 spaced at regular intervals (e.g., 2 in. (50 mm) intervals) along each leg 21 are provided radially through each leg so that the elevation of the planar member 5 above the ground may be varied according to which opening 43 is lined up with horizontally aligned openings 39 of the brackets 35. The legs 21 may be slidably removed from the brackets 35 when the platform 1 is not in use.

As shown in FIGS. 3 and 6, the planar member 5 is preferably of a generally channel-shaped configuration with depending flanges 45 at its front and back, each flange having an inwardly turned generally horizontal lip 47 at its lower end. The overall dimension D of the hook 23 on each leg is slightly less than the distance between the depending flanges 45 but greater than the distance between the inwardly directed lips 47, the arrangement being such that the hook means 15 may be stored in the channel-shaped planar member 5 with each leg 21 received between the underside of the grate 20 and a respective lip at one side of the channel and the elongate plate 27 attached to the inner portion 25 of the hook received between the underside of the grate and the lip at the opposite side of the channel. Means (e.g., spring clips 49) is provided on the underside of the planar member 5 at its sides 11, 13 for releasably holding the inner portions 25 of the legs 21 in the channel. In addition, stops 51 engageable with the lower ends of the legs 21 are welded on the opposite sides of the channel between the lips 47 and the underside of the planar member 5, that is, adjacent the front 7 and back 9 of the planar member 5. It will be understood that the channel, clips 49 and stops 51 constitute one means for storing the hook means generally within the planar member.

FIG. 7 illustrates another embodiment of the invention generally corresponding to the embodiment of FIGS. 1-6, the principal difference being that each hook, here designated 23A, is formed for hooking over an upper edge of the front bumper 17 of the vehicle 3 to suspend the platform from the front bumper. A layer of protective padding 53 may be provided on each hook 23A and on each leg 21A to protect the finish of the bumper 17. The curved outer portion 55 of each hook 23A is adjustable with respect to the inner portion 57 to vary the distance between the outer portions and the legs 21A for positioning the planar member 5 in a generally horizontal plane. A plurality of openings may be provided for a bolt 59 so that the length of the hook 23A may be varied. In addition to, or in lieu of, a plurality of openings, a vertically adjustable bolt (not shown) may be provided for engaging the upper surface of the bumper 17 to compensate for curvature of the upper surface so that the planar member is positioned in a generally horizontal plane.

To suspend the platform 1 from the front wheel 19 of the truck, the legs 21 are removed from the channel and the lower ends of the legs are inserted in the vertically aligned openings 37 of the brackets 35. A pin 41 is inserted through an appropriate opening 43 of each leg and the horizontally aligned openings 39 of a respective bracket 35. The outer portion or plate 27 of each hook 23 is rotated to adjust the distance between the plates and legs according the the size of the front wheel. When this distance is properly adjusted, each plate 27 is pivoted or "angled" inwardly so that the plates "point" to the front axle (not shown) of the vehicle. The hooks 23 are then placed or "hooked" over the wheel 19 to suspend the platform 1 from the wheel. It will be observed that the planar member 5 is suspended in a position wherein it is generally horizontal and at an elevation above the ground where a person standing on the planar member has convenient access to the engine compartment of the vehicle 3.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A platform for supporting a person while working in the engine compartment of a vehicle, such as a truck, the platform comprising:

a planar member having a generally channel-shaped configuration with depending flanges at its front and back, each flange having an inwardly turned, generally horizontal lip adjacent its lower end, a pair of hook means, each hook means comprising a leg and a hook on the leg adapted to hook over the wheel of the vehicle, and means for releasably attaching the planar member to the hook means to support the planar member on the hook means, the hook of each hook means comprising an inner portion extending from the leg adapted to extend over the top of the wheel, and an outer portion at the outer end of the inner portion adapted to engage the back side of the wheel, the inner portion having a length less than the distance between the flanges on the planar member but greater than the distance between the lips on the flanges, so that the hook means can be stored on the underside of the planar member between the flanges with at least a portion of the hook means disposed between the lips and the bottom of the planar member.

2. The device according to claim 1 further comprising means on the underside of the planar member for releasably holding the hook means on the underside of the planar member.

3. The device according to claim 2 wherein the means for releasably holding the hook means comprises a clip at each side of the planar member for engaging the inner portion of one of the hook means.

* * * * *